United States Patent Office 2,998,304
Patented Aug. 29, 1961

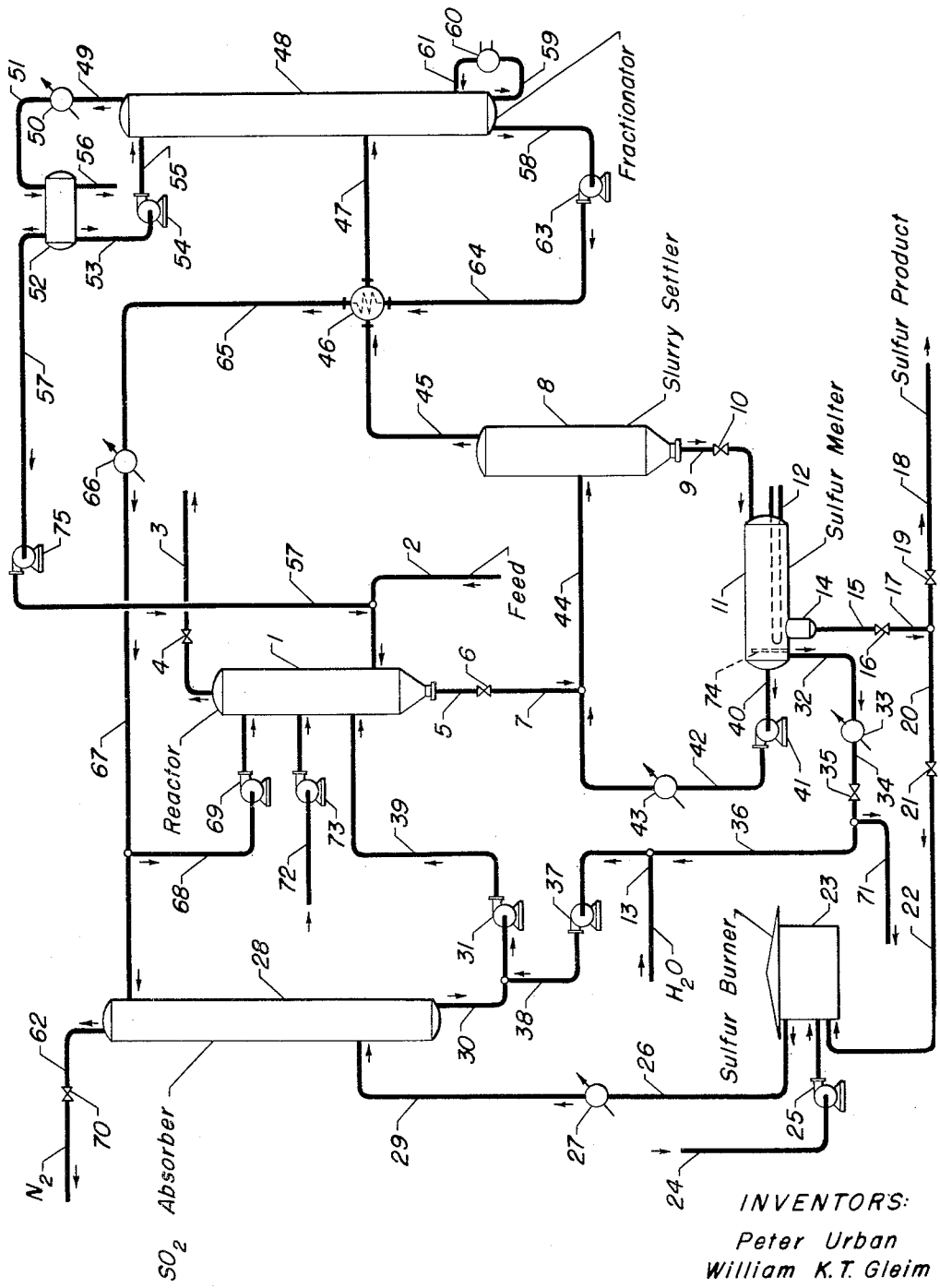

2,998,304
PRODUCTION OF SULFUR
Peter Urban, Northbrook, and William K. T. Gleim, Island Lake, Ill., assignors, by mesne assignments, to Universal Oil Products Company, Des Plaines, Ill., a corporation of Delaware
Filed Dec. 8, 1958, Ser. No. 778,938
8 Claims. (Cl. 23—225)

This invention relates to a method for the production of sulfur and particularly to a method for producing sulfur from hydrogen sulfide. In addition the invention also relates to a method of purifying a gas stream by removing hydrogen sulfide from said stream.

In many industrial processes large amounts of sulfur are wasted by being vented to the atmosphere as hydrogen sulfide. Typical of these are processes for preparing various petroleum products, coking of coal, steel manufacture and others. In many cases, particularly in the refining of gasoline, the sulfur is a contaminant in the ultimate desired product and is converted to hydrogen sulfide during processing and disposed of in that form. Besides being wasteful, the venting of hydrogen sulfide to the atmosphere creates a nuisance, due to its unpleasant odor, which must be abated in many communities in order to conform to local regulations pertaining thereto.

Several solutions to this problem have been put into effect and these solutions are concerned in the most part with the abatement of the nuisance rather than the conservation of the sulfur thus produced. The processes are usually difficult to effect and, in the most part, are relatively costly, said processes usually consisting of converting the hydrogen sulfide to sulfur or sulfuric acid or to some other form of sulfur which is salable to industry. One such solution has been to separate the hydrogen sulfide from the main stream by such means as an absorber employing an alkaline liquid such as an amine or metal hydroxide solution in countercurrent contact with the hydrogen sulfide-containing gas. The absorbing liquid is then stripped of hydrogen sulfide and the hydrogen sulfide is partially burned to form sulfur dioxide and water, the remainder of the hydrogen sulfide being reacted with sulfur dioxide to produce sulfur and water. The reaction is effected at high temperatures and preferably at high pressures while utilizing a heterogeneous catalyst such as bauxite. This method has many unsatisfactory features including the expense and difficulty of concentrating hydrogen sulfide by means of an alkaline solution with subsequent stripping, the use of heterogeneous catalysts which are not too well suited to chemical processes resulting in solid products, the difficulty of using corrosive materials such as water-sulfur dioxide mixtures at high temperatures and, in fact, the added difficulty of employing high temperatures with the attendant cost of providing heating means and maintaining these means at the required temperatures. In addition, other prior art methods have employed a hygroscopic solvent wherein the sulfur dioxide and hydrogen sulfide may be dissolved and reacted in the presence of a catalytic amount of water to form sulfur. However, the solvents which have been used consisted of organic hydroxy materials such as mono- and polyalcohols, one particular type of solvents which were used comprising ethylene glycol, diethylene glycol, triethylene glycol, etc. A disadvantage of using solvents of this type is that this type of solvent is relatively expensive and, in order to make the process commercially feasible, must be recovered and recycled to the reactor, thus necessitating the added expense of a solvent recovery system which must operate at peak efficiency.

It is therefore an object of this invention to provide a process for recovering substantially pure sulfur from a gas stream containing hydrogen sulfide.

A further object of this invention is to provide a process for producing sulfur from a gas stream by providing a simple liquid phase low temperature process which will result in large conversions of hydrogen sulfide to substantially pure sulfur in a relatively inexpensive process.

One embodiment of this invention resides in a process for the production of sulfur which comprises absorbing sulfur dioxide and hydrogen sulfide in a water-saturated hydrocarbon solvent, reacting said sulfur dioxide and said hydrogen sulfide in contact with said solvent and free water and in the presence of a detergent thereby forming a sulfur in a more readily recoverable state, and separating said sulfur from said solvent, detergent and water.

A further embodiment of the invention is found in a process for the production of sulfur which comprises absorbing sulfur dioxide and hydrogen sulfide in a water-saturated hydrocarbon solvent, reacting said sulfur dioxide and said hydrogen sulfide in contact with said solvent and a catalytic amount of free water and in the presence of an oil-soluble detergent thereby forming sulfur in a more readily recoverable state, and separating said sulfur from said solvent, detergent and water.

Yet another embodiment of the invention is found in a process for the production of sulfur which comprises absorbing sulfur dioxide and hydrogen sulfide in a water saturated hydrocarbon solvent boiling in the range of from about 375° to about 600° F., reacting said sulfur dioxide and said hydrogen sulfide in contact with said solvent in a catalytic amount of free water and in the presence of a detergent thereby forming sulfur in a more readily recoverable state and separating said sulfur from said solvent, detergent and water.

A specific embodiment of this invention resides in a process for the production of sulfur which comprises absorbing sulfur dioxide in a water-saturated kerosene, reacting said sulfur dioxide and said hydrogen sulfide in contact with said kerosene and a catalytic amount of free water and in the presence of an aralkyl sulfonate thereby forming sulfur in a more readily recoverable state, and separating said sulfur from said kerosene, aralkyl sulfonate and water.

Other objects and embodiments referring to alternative solvents and to alternative detergents will be found in the following further detailed description of this invention.

It has now been discovered that sulfur may be produced by removing hydrogen sulfide from a refinery gas or natural gas stream by reacting said hydrogen sulfide with sulfur dioxide in contact with a water-saturated hydrocarbon solvent and a catalytic amount of free water in the presence of a detergent. The amount of water necessary for the reaction is that amount required to saturate the hydrocarbon plus an excess sufficient to provide a two phase system. Preferred hydrocarbon solvents are those which dissolve a small amount of water. Such hydrocarbon solvents may be characterized also as being substantially immiscible with sulfur and with large amounts of water. Examples of solvents which may be used include aromatic compounds such as benzene, toluene, o-xylene, m-xylene, p-xylene, ethylbenzene, etc.; straight chain paraffins such as the isomeric hexanes, heptanes, octanes, nonanes, decanes, undecanes, dodecanes, etc.; cyclic paraffins such as cyclopentane, cyclohexane, cycloheptane, methylcyclopentane, methylcyclohexane, etc.; olefinic hydrocarbons such as 1-pentene, 2-pentene, 1,2-pentadiene, 1,3-pentadiene, 1-hexene, 2-hexene, 3-hexene, 1,2-hexadiene, 1,3-hexadiene, the isomertic heptenes, heptadienes, octenes, octadienes, nonenes, nonadienes, etc., cyclopentene, cyclopentadiene, cyclohexene, cyclohexadiene, etc., styrene, the allylbenzenes, etc., mixtures of the above mentioned solvents, higher boiling solvents such as kerosene, cracked naphtha, straight run naphtha, heavy reformate, etc., the preferred solvents having a boiling point of from about 375° to about 600° F. The above enumerated hydrocarbons are only representative of the type of solvent which may be used, and the process of the present invention is not necessarily limited to these hydrocarbons. As is readily apparent these compounds may comprise or contain aromatic hydrocarbons. In addition, solvents of this type are relatively inexpensive and therefore a solvent recovery system is not required in the overall process of the present invention, thereby minimizing equipment needs in the present process. The omission of a solvent recovery system will therefore greatly reduce both the initial cost of the process and also reduce the operating cost during the operation thereof. When prior art organic solvents such as mono- and polyhydroxy alcohols are used, the cost of such solvents will necessitate the recovery thereof. Furthermore the solvents which are required for the present process are usually readily available at the site of the process and will thus further reduce the cost inasmuch as no transportation will be involved.

The use of a detergent which is oil-soluble, water-soluble, oil and water-soluble or mixtures of these types of detergents will result in the obtention of sulfur in a more readily recoverable state. Without the use of a detergent the sulfur which is formed from the combination of sulfur dioxide and hydrogen sulfide at the interface between the solvent and the catalytic amount of free water is flocculent and tacky. This form of sulfur has a tendency to adhere to the walls of the reactor and is therefore relatively difficult to withdraw from the reactor to the slurry settler and from said slurry settler to the sulfur melter, due to said tendency to adhere to the walls of the pipes and the vessels through which it must pass before being melted to the molten state. The use of a detergent of the type hereinafter set forth prevents the agglomeration of sulfur. Therefore, by the use of a detergent in the reaction zone the equipment required for separating the sulfur thus produced will be of a relatively more simple design and reduced cost.

In order to produce sulfur according to this process it is necessary to provide an excess of sulfur over the saturation point of sulfur in the hydrocarbon solvent before the sulfur will crystallize. Therefore, it may be advantageous to have the hydrocarbon solvent seeded with sulfur to aid in the reaction. This problem is overcome by the design of the process which is hereinafter described. Furthermore, the sulfur-water corrosion which may take place will be limited to only those areas of the plant where a mixed water and hydrocarbon solvent phase appears, such as the reactor and the sulfur settler. This is a distinct advantage over prior art processes involving the use of hydroxy substituted solvents where the corrosion problem is a major factor in plant maintenance and replacement costs.

As will be noted from the description of the process hereinafter set forth it will be necessary to charge elemental sulfur and water to the system only at the start up of the process, after which the sulfur and water necessary for the production of sulfur dioxide and water-saturation of the solvent respectively will be furnished by the products resulting from the reaction of the process, the excess sulfur and water being removed from the system. This may also apply to the detergent which will be recovered and recycled in which ever phase it is soluble.

Examples of detergents which may be employed in the present process include water-soluble detergents such as alkyl aryl sulfonates and the salts thereof such as the sodium salt of dodecylbenzene sulfonate, the diamyl ester of sulfosuccinic acid, sulfated fatty acid esters, sodium tetrahydronaphthalene sulfonate, $C_{12}$ to $C_{16}$ alkyl sulfates, oleyl sodium methyl taurate, monobutylphenyl phenol sodium monosulfonate, glycerol monostearate, alkyl polyoxyethylene alcohols, dodecyl toluene sodium sulfonate, dodecyl xylene potassium sulfonate, ethylene oxide condensation products of octylphenol, alkyl amido sulfates, sodium salts of sulfoesters of fatty alkanol amides, sorbitan monostearate polyoxyethylene derivatives, etc.; oil-soluble detergents such as polyethylene glycol oleate, mannitan monooleate, octadecyl dimethylbenzyl ammonium chloride, N-alkylated alkylene polyamines, polyamino carboxylic acid salts, lauryl pyridinium chloride, toluene sodium sulfonate, etc., water and oil-soluble detergents such as sodium salts of sulfonated mono- and diamylnaphthalenes, polyoxyalkylene glucose tetrastearates, pentaerythritol monostearate, pentaerythritol monocaprate, sorbitan monopalmitate, sorbitan monostearate, dimeric alkylated arylpolyether alcohols, phthalic glycerol alkyl resins, etc. The aforementioned detergents may be used by themselves or mixtures thereof may be used in the process of this invention, said detergents being generally used in an amount of from about 0.01% to about 1% by weight of the hydrocarbon solvent and water present. It is to be understood that the aforementioned detergents are only representatives of the class of compounds which may be used and that the present invention is not necessarily limited thereto.

The process of this invention will be best described with reference to the accompanying drawing which is intended to be illustrative of the invention rather than limiting the broad scope thereof.

In the drawing a gas stream containing hydrogen sulfide enters reactor 1 in the lower portion thereof through line 2. Reactor 1 is a conventional design countercurrent gas-liquid contacting vessel. The reaction takes place in the mixed hydrocarbon and water phases. The gas stream may be, for example, the normally gaseous material in the effluent from a petroleum desulfurization or reforming process, in which case it may be desirable to recirculate the hydrogen in the process. Prior to recirculation it may be desirable to remove the hydrogen sulfide from said gas inasmuch as hydrogen sulfide may have an adverse effect upon the catalysts employed in such processes. The gas passes up through reactor 1 and is contacted with a descending water and water containing-hydrocarbon solvent stream in which sulfur dioxide has been absorbed and which is introduced to reactor 1 through line 39. A detergent, either water-soluble, oil-soluble or oil and water-soluble is pumped into reactor 1 through line 72 by means of pump 73. Alternatively of both water- and oil-soluble detergents are used they may be pumped through separate lines into reactor 1 or may be admixed and charged to the reactor through a single line.

The reactor will contain internal means for effecting intimate contact between the rising gas stream and the descending liquid stream such as, but not limited to, perforated plates, bubble cap plates, turbo-grid trays, packings, screens or any other conventional means or device for causing such contact. The temperature of the reaction is maintained in the range of from about 75° to about 250° F. and the pressure in the range of from about atmospheric pressure to about 5000 p.s.i.g. The only limitation on this process is that the conditions must be such as to maintain the solvent in liquid phase at reaction conditions. With the solvent maintained at these conditions the absorbed sulfur dioxide and hydrogen sulfide react to form pure sulfur and water, said sulfur being formed in an easily recoverable state, i.e. not tacky or flocculent, but in a crystalline form. Any residual hydrogen sulfide and/or sulfur dioxide are scrubbed from the ascending gas stream in an upper section of reactor 1 by contact with descending lean solvent introduced to the upper section of reactor 1 through line 68 by means of pump 69. The remaining gas passes from the reactor through line 3 provided with pressure control valve 4, for recovery of desired components therefrom. The selection of a suitable hydrocarbon solvent and the use of proper operating conditions will cause substantially complete reaction of the hydrogen sulfide with sulfur dioxide so that the residual unreacted components in the liquid stream discharging from reactor 1 will be negligible. A liquid stream which contains organic hydrocarbon solvent, water, detergent and sulfur, passes out of the bottom of reactor 1 through line 5 provided with pressure control valve 6 and through line 7 to a slurry settler 8. In settler 8, the liquid reaction zone effluent settles into a hydrocarbon solvent-detergent layer and into a water-sulfur slurry layer. In the event that a water-soluble detergent is used the lower layer in slurry settler 8 will comprise a water-sulfur slurry layer containing the detergent. The water, detergent and sulfur, with some hydrocarbon solvent, are passed through line 9 provided with pressure control valve 10 into a sulfur melter 11 provided with heating means 12 and a baffle 74. The water, detergent, sulfur and hydrocarbon slurry is then heated by means of an external source such as steam whereby the sulfur is melted to the molten state and passes into a drop-out pot container 14, after which it is withdrawn through line 15 provided with control valve 16 and line 17. The main portion of the sulfur product, or net sulfur produced, is withdrawn from the process through line 18 containing pressure control valve 19 to sulfur storage, not shown. Another portion of the sulfur may be passed through line 20 provided with valve 21 and through line 22 into a sulfur burner 23 where it is burned with air pumped in through line 24 by pump 25. The sulfur dioxide and nitrogen which are formed in the sulfur burner 23 are withdrawn through line 26 and cooled by means of a cooler 27 to a desired absorption temperature. From the cooler the sulfur dioxide and nitrogen enter a lower section of sulfur dioxide absorber 28 through line 29, absorber 28 being a conventional countercurrent gas-liquid contacting vessel. The sulfur dioxide is absorbed in a countercurrent manner in the lean dry solvent, of the type hereinbefore set forth, in absorber 28 and is withdrawn in solution in the solvent from the bottom of the absorber through line 30 by fat solvent pump 31. The nitrogen which is present is withdrawn from the top of absorber 28 through line 62 provided with pressure control valve 70. Sufficient water to more than saturate the fat solvent stream is added to line 30 through line 38 by pump 37. This water may be obtained from an external source through line 13 or may be drained from sulfur melter 11. In the latter case, the water containing the detergent is withdrawn from sulfur melter 11 through line 32 after passing over baffle 74 in the melter, cooled by means of cooler 33, and passed through line 34 provided with pressure control valve 35 through line 36 to pump 37. The excess water over what is required for the reaction is withdrawn from the system through line 71, while the remaining water is pumped through line 38 and is admixed with the aforesaid fat solvent containing the absorbed sulfur dioxide, said mixture then passing through solvent pump 31 and line 39 to reactor 1. The hydrocarbon which is recovered in sulfur melter 11 and which will contain a residual amount of dissolved sulfur is withdrawn from sulfur melter 11 through line 40 by pump 41 and is passed through line 42 to cooler 43. The hydrocarbon is then cooled and passes through line 44 back to the sulfur slurry settler 8 where additional sulfur will form in a more easily recoverable state. The solvent containing the oil-soluble detergent is withdrawn overhead from sulfur settler 8 through line 45 and passes through heat exchanger 46 where the solvent is heated. The heated solvent containing low molecular weight hydrocarbons, dissolved sulfur, detergent and water passes through line 47 to fractionator 48 where the solvent and other components are fractionated azeotropically. The overhead products comprising low molecular weight hydrocarbons, some traces of sulfur dioxide, water, and some solvent, are withdrawn from the top of fractionator 48 through line 49 provided with a cooler 50 wherein said overhead is condensed and passes through line 51 to a receiver 52. A portion of the liquid overhead is withdrawn from receiver 52 through line 53 provided with pump 54 and recycled to fractionator 48 through line 55, said liquid overhead acting as reflux. In receiver 52, the overhead separates into a hydrocarbon layer and a water layer. The water layer is withdrawn through line 56. Another portion of the overhead comprising light hydrocarbon gases is pumped through line 57 by means of pump 75 where it is admixed with fresh feed and passes into reactor 1 through line 2. The water-free hydrocarbon lean solvent containing the oil-soluble detergent is withdrawn from the bottom of fractionator 48 through line 58. A portion of the lean solvent is passed through line 59, heated by means of reboiler 60 which provides heat for fractionation zone 48, and passed through line 61 back to the fractionator. Another portion of the lean solvent is withdrawn from fractionator 48 through line 58 and passed by pump 63 to line 64 and heat exchanger 46. The cooled, regenerated lean solvent then passes through line 65 to cooler 66 where the solvent is cooled further. The soluble sulfur still present in the lean solvent granulates due to reduction in temperature and is used as the seeding agent for the production of additional sulfur when the solvent is returned to the reactor through line 68 by means of pump 69. Another portion of the cooled solvent passes through line 67 back to the sulfur dioxide absorber 28 where the sulfur dioxide entering through line 29 is absorbed in a countercurrent stream.

The following examples are given to illustrate the process of the present invention, which, however, are not intended to limit the generally broad scope of the present invention in strict accordance therewith.

*Example I*

A quantity of sulfur is charged to a sulfur burner at a temperature of about 270° F. and at a pressure of about 45 p.s.i.g. wherein said sulfur is burned with air, the air being charged to the burner at a temperature of about 60° F. and at a pressure of about 45 p.s.i.g. The resultant sulfur dioxide and nitrogen pass from the burner at a temperature of about 600° F. and a pressure of about 45 p.s.i.g. to a cooler wherein the gases are cooled to a temperature of about 110° F. The cooled gases are then passed into a sulfur dioxide absorber at this temperature and a pressure of 45 p.s.i.g. In the absorber the sulfur dioxide is contacted with a downward flowing stream of lean dry solvent which has been charged to said absorber at a temperature of 110° F. and a pressure of 40 p.s.i.g. whereby the sulfur dioxide is absorbed therein. The nitrogen which enters the absorber along with the sulfur dioxide is vented overhead. The fat solvent containing the absorbed sulfur dioxide is withdrawn from the bottom of the absorber at a temperature of about 112° F., said bottoms containing sulfur, sulfur dioxide and a small amount of nitrogen. Before passing to the reactor, the fat solvent is admixed with water at a temperature of about 60° F. and a pressure of 500 p.s.i.g. The water saturated solvent such as cracked naphtha is then charged to a reactor at a temperature of 112° F. and a pressure of 500 p.s.i.g. A feed stock comprising a mixture of paraffinic hydrocarbons and containing carbon dioxide, hydrogen sulfide and nitrogen is charged to the reactor at a temperature of 100° F. and a pressure of 500 p.s.i.g. In addition, a detergent such as an aralkyl sulfonate is also charged to the reactor at a temperature of about 100° F. and a pressure of about 500 p.s.i.g. In this reactor, the hydrogen sulfide in the feed stock reacts with the sulfur dioxide which is absorbed in the solvent and the sulfur is produced at the interface between the water and the solvent. The detergent which is present in the mixture causes the sulfur to form in a crystalline shape rather than the flocculent and tacky form which occurs when the detergent is omitted and thus is more readily recoverable from the system. The overhead from the reactor is withdrawn at a temperature of 110° F. and a pressure of 500 p.s.i.g. to a gas concentration plant while the bottoms from the reactor are withdrawn at a temperature of about 160° F., a pressure of 100 p.s.i.g. and passed to a slurry settler. The reactor bottoms contain sulfur, a small amount of nitrogen, carbon dioxide, the paraffinic hydrocarbons, water, solvent and detergent. In the slurry settler the liquid reaction zone effluent settles into a hydrocarbon solvent layer and a water-sulfur slurry layer containing the detergent. The bottoms from the slurry settler are passed to a sulfur melter at a temperature of about 160° F. and a pressure of 100 p.s.i.g. In the sulfur melter the mixture is heated by means of an external source to a temperature of about 270° F. wherein the sulfur is melted and passes out of the sulfur melter into a drop-out pot. The sulfur is withdrawn from the drop-out pot at a temperature of about 270° F. and a pressure of 90 p.s.i.g., a portion of the net sulfur thus produced going to a sulfur storage plant while another portion of said sulfur is charged to the sulfur burner in the manner hereinbefore set forth. Water containing the water-soluble detergent is also withdrawn from the sulfur melter at a temperature of about 270° F. and passes to a cooler where it is cooled to a temperature of approximately 110° F. A portion being withdrawn as surplus while another portion is recycled to be admixed with the fat solvent passing from the sulfur dioxide absorber, thereby providing the water of saturation for the fat solvent and the excess required to provide a two phase system whereby solvent is formed at the interface between the two phases. In addition, the water still contains the water-soluble detergent which provides a portion of the total amount of detergent required in the reaction. The hydrocarbon solvent layer from the sulfur melter is withdrawn and passes to a cooler where said solvent is cooled to a temperature of about 160° F. and a pressure of about 100 p.s.i.g. This stream is then recycled to the slurry settler, being admixed with the bottoms from the reactor before admission into said slurry settler.

Another portion of the hydrocarbon solvent layer in the slurry settler is withdrawn as overhead at a temperature of about 162° F. and passed to a heat exchanger where the mixture is heated to a temperature of about 370° F., thereafter being passed to a fractionator where the solvent and other components are fractionated azeotropically. The bottoms from the fractionator containing solvent along with a certain portion of sulfur dissolved therein are withdrawn from the bottom of the fractionator at a temperature of about 450° F. and a pressure of 70 p.s.i.g. These bottoms are pumped through a heat exchanger wherein the bottoms are partially cooled and then passed through a cooler where they are further cooled to a temperature of about 110° F. A portion of this lean dry solvent containing the granular sulfur which is required to seed the reaction is passed through a pump wherein the pressure is raised to 500 p.s.i.g. to the upper portion of the reactor while another portion of the lean dry solvent at a temperature of about 110° F. and a pressure of 40 p.s.i.g. passes to the top of the sulfur trioxide absorber. The overhead from the fractionator is withdrawn at a temperature of about 245° F. and a pressure of 55 p.s.i.g. to a cooler wherein the effluent is cooled to a temperature of approximately 110° F. The thus cooled overhead containing nitrogen, carbon dioxide in relatively small portions compared to the paraffinic hydrocarbons present is passed to a receiver. A portion of this overhead is withdrawn from the receiver and recycled to the fractionator as liquid overhead acting as a reflux, the gas portion of the overhead being admixed with fresh feed and passing into the reactor while another portion is withdrawn as natural gas to a stabilizer.

*Example II*

A quantity of sulfur is charged to a sulfur burner at a temperature of about 270° F. and at a pressure of about 45 p.s.i.g. wherein said sulfur is burned with air, the air being charged to the burner at a temperature of about 60° F. and at a pressure of about 45 p.s.i.g. The resultant sulfur dioxide and nitrogen pass from the burner at a temperature of about 600° F. and a pressure of about 45 p.s.i.g. to a cooler wherein the gases are cooled to a temperature of about 110° F. The cooled gases are then passed into a sulfur dioxide absorber at this temperature and a pressure of 45 p.s.i.g. In the absorber the sulfur dioxide is contacted with a downward flowing stream of lean dry solvent which has been charged to said absorber at a temperature of 110° F. and a pressure of 40 p.s.i.g. whereby the sulfur dioxide is absorbed therein. The nitrogen which enters the absorber along with the sulfur dioxide is vented overhead. The fat solvent containing the absorbed sulfur dioxide is withdrawn from the bottom of the absorber at a temperature of about 112° F., said bottoms containing sulfur, sulfur dioxide and a small amount of nitrogen. Before passing to the reactor, the fat solvent is admixed with water at a temperature of about 60° F. and a pressure of 500 p.s.i.g. The water saturated solvent such as straight-run naphtha is then charged to a reactor at a temperature of 112° F. and a pressure of 500 p.s.i.g. A feed stock comprising a mixture of paraffinic hydrocarbons and containing carbon dioxide, hydrogen sulfide and nitrogen is charged to the reactor at a temperature of 100° F. and a pressure of 500 p.s.i.g. In addition, a detergent such as a tertiary acetylenic glycol is also charged to the reactor at a temperature of about 100° F. and a pressure of about 500 p.s.i.g. In this reactor, the hydrogen sulfide in the feed stock reacts with the sulfur dioxide which is absorbed in the solvent and the sulfur is produced at the interface between the water and the solvent. The deterent which is present in the mixture causes the sulfur to form in a crystalline shape rather than the flocculent and tacky form which occurs when the detergent is omitted thereby allowing the sulfur to be recovered more readily than when in a tacky form. The overhead from the reactor is withdrawn at a temperature of 110° F. and a pressure of 500 p.s.i.g. to a gas concentration plant while the bottoms from the reactor are withdrawn at a temperature of about 160° F., a pressure of 100 p.s.i.g. and passed to a slurry settler. The reactor bottoms contain sulfur, a small amount of nitrogen, carbon dioxide, the paraffinic hydrocarbons, water, solvent and detergent. In the slurry settler the liquid reaction zone effluent settles into a hydrocarbon solvent layer and a water-sulfur slurry layer containing the detergent. The bottoms from the slurry settler are passed to a sulfur melter at a temperature of about 160° F. and a pressure of 100 p.s.i.g. In the sulfur melter the mixture is heated by means of an external source to a temperature of about 270° F. wherein the sulfur is melted and passes out of the sulfur melter into a drop-out pot. The sulfur is withdrawn from the drop-out pot at a temperature of about 270° F. and a pressure of 90 p.s.i.g., a portion of the net sulfur thus produced going to a sulfur storage plant while another portion of said sulfur is charged to the sulfur burner in the manner hereinbefore set forth. Water is also withdrawn from the sulfur melter at a temperature of about 270° F. and passes to a cooler where it is cooled to a temperature of approximately 110° F. A portion is withdrawn as surplus while another portion is recycled to be admixed with the fat solvent passing from the sulfur dioxide absorber, thereby providing the water of saturation for the fat solvent and the excess required to provide a two phase system whereby solvent is formed at the interface between the two phases. The hydrocarbon solvent layer from the sulfur melter containing the oil-soluble detergent is withdrawn and passes to a cooler where said solvent is cooled to a temperature of about 160° F. and a pressure of about 100 p.s.i.g. This stream is then recycled to the slurry settler, being admixed with the bottoms from the reactor before admission into said slurry settler.

Another portion of the hydrocarbon solvent layer in the slurry settler is withdrawn as overhead at a temperature of about 162° F. and passed to a heat exchanger where the mixture is heated to a temperature of about 370° F., thereafter being passed to a fractionator where the solvent and other components are fractionated azeotropically. The bottoms from the fractionator containing solvent along with a certain portion of detergent and sulfur dissolved therein are withdrawn from the bottom of the fractionator at a temperature of about 450° F. and a pressure of 70 p.s.i.g. These bottoms are pumped through a heat exchanger wherein the bottoms are partially cooled and then passed through a cooler where they are further cooled to a temperature of about 110° F. A portion of this lean dry solvent containing oil-soluble detergent and the granular sulfur which is required to seed the reaction is passed through a pump wherein the pressure is raised to 500 p.s.i.g. to the upper portion of the reactor while another portion of the lean dry solvent at a temperature of about 110° F. and a pressure of 40 p.s.i.g. passes to the top of the sulfur trioxide absorber. The overhead from the fractionator is withdrawn at a temperature of about 245° F. and a pressure of 55 p.s.i.g. to a cooler wherein the effluent is cooled to a temperature of approximately 110° F. The thus cooled overhead containing nitrogen, carbon dioxide and relatively small portions to the paraffinic hydrocarbons present is passed to a receiver. A portion of this overhead is withdrawn from the receiver and recycled to the fractionator as liquid overhead acting as a reflux, the gas portion of the overhead being admixed with fresh feed and passing into the reactor while another portion is withdrawn as natural gas to a stabilizer.

We claim as our invention:

1. A process for the production of sulfur which comprises absorbing sulfur dioxide and hydrogen sulfide in a water-saturated hydrocarbon solvent, reacting said sulfur dioxide and said hydrogen sulfide in the presence of a detergent and in contact with said solvent and a sufficient excess of additional free water to form a hydrocarbon solvent phase and an aqueous sulfur-containing phase, said detergent being soluble in at least one of said phases and being present in sufficient amount to prevent agglomeration of sulfur, separating the resultant reaction mixture into a hydrocarbon solvent layer and an aqueous sulfur-containing layer, and recovering sulfur from said aqueous layer.

2. The process of claim 1 further characterized in that said detergent is oil-soluble.

3. The process of claim 1 further characterized in that said detergent is water-soluble.

4. The process of claim 1 further characterized in that said solvent is a hydrocarbon distillate boiling in the range of from about 375° to about 600° F.

5. The process of claim 1 further characterized in that said solvent is a kerosene distillate.

6. The process of claim 1 further characterized in that said detergent is an aralkyl sulfonate.

7. The process of claim 1 further characterized in that said detergent is a tertiary acetylenic glycol.

8. The process of claim 1 further characterized in that said detergent is a quaternary ammonium halide.

References Cited in the file of this patent

UNITED STATES PATENTS

| | | |
|---|---|---|
| 1,900,398 | Jacobson | Mar. 7, 1933 |
| 1,964,808 | Bottoms | July 3, 1934 |
| 2,177,068 | Hutchinson | Oct. 24, 1939 |
| 2,614,904 | Royer | Oct. 21, 1952 |
| 2,767,060 | Sloan | Oct. 16, 1956 |
| 2,881,047 | Townsend | Apr. 7, 1959 |